May 2, 1967     D. S. BARTLETT, JR     3,316,687

STRAP SECURING METHOD

Filed Feb. 6, 1964

3,316,687
STRAP SECURING METHOD

David Sabin Bartlett, Jr., San Jose, Calif., assignor to FMC Corporation, Philadelphia, Pa., a corporation of Delaware
Filed Feb. 6, 1964, Ser. No. 343,000
1 Claim. (Cl. 53—33)

This invention relates to a method of securing together in face-to-face relationship two portions of a flat strap, for example, overlapping portions of a reinforcing strap extending about a box or the like or the ends of two separate straps. More particularly the invention is directed to a method of joining or securing together two portions of stretch oriented polymeric strap of the type recently gaining popularity as a substitute for the long-used steel band strapping.

In the packaging field it is common to provide bands of various kinds about the packaged article. For example, corrugated containers or wooden boxes may be banded for reinforcement purposes or to hold them closed. Bales generally must be held under compression by bands extending thereabout. Bands are provided about a number of small packages to hold them together in what is called a unitized package or bundle. For convenience of loading and in-plant handling, articles are frequently secured to pallets by means of bands. Depending somewhat upon the specific nature of the above type of operation, different materials such as wire, rope, steel strap, non-metallic strap, adhesive strips and the like have been employed for banding. Except in the case of adhesive strips, which are suitable for only a limited field, the particular manner of securing the ends of the bands together to hold them in place depends substantially upon the specific nature of the banding material and since the securing means is obviously an important element in the strength of the band much effort has been expended in improving the same.

Bands in the form of flat straps offer certain advantages over materials having a circular cross section. Until fairly recently such straps have been made of steel and the ends have generally been secured together in overlapping relation by crimping a metal seal or sleeve thereabout, although sometimes the ends have been spot welded together. Steel band strapping however also has its disadvantages, for example, it is difficult to remove without special cutting shears and once removed it is difficult to dispose of. Because of these and other disadvantages of steel, flat straps formed of other materials have been introduced, the most recent being made of synthetic polymeric material. These polymeric straps cannot be effectively secured by the same means employed for straps formed of other materials and the present invention is directed toward a method of securing together in overlapping relationship the ends of straps of this nature.

Polymeric strap suitable for use in the packaging field may be formed of numerous specific long-chain linear film-forming polymers and copolymers. For reasons of economic feasibility a preferred material is polypropylene and the invention will be specifically described as applied to a polypropylene strap. However, it is to be understood that in its more general aspects the invention is applicable to straps formed of other polymers and copolymers such as other polyolefins, polyesters, polyamids, acrilic resins, etc.

The exact or specific method of forming a polymeric strap of course depends upon the particular polymer but in general the strap is formed by extruding the molten polymer through a slitted orifice to form a structure in which the long-chain molecules of the polymer are heterogeneously oriented. This initial structure is characterized by a relatively low tenacity and either a high elongation or brittleness. However, upon stretching the structure longitudinally, usually at elevated temperature, the molecules become uniaxially oriented in the main longitudinally of the structure and the tenacity is greatly increased while the elongation and/or brittleness is substantially reduced. This resultant structure is the type of strap toward the securement of which the present invention is directed and the same will be referred to as "stretch oriented polymeric strap". In some instances the strap itself is formed by slitting a wide sheet into the desired strap widths and in other cases the slitted orifice is of such width that after the stretching operation the resultant structure has the desired width. At this point, it should be mentioned that most stretch oriented polymeric strap has a fairly low melting point but if it is heated even to the temperature at which it was stretch oriented, which may be considerably below the melting point, it will shrink back to approximately the length it had before stretching and will lose its uniaxial molecular orientation and consequently lose tenacity.

It is the general object of the present invention to provide a method of securing together two portions of stretch oriented polymeric strap in such manner that the joint is able to withstand substantially as much tension as the strap per se.

A more specific object of this invention is to provide a rapid method of heat sealing together two portions of stretch oriented polymeric strap in such manner as to avoid substantial loss of molecular orientation.

Other and further objects, features and advantages of the invention will become apparent as the description of a preferred form thereof proceeds.

Referring now to the accompanying drawing.

Since the invention involves only the method and can be carried out with many specifically different types of apparatus, no attempt has been made to show the apparatus to scale. In fact a scale drawing would be impracticable inasmuch as it is desirable to show the strap itself on a greatly enlarged scale since the normal thickness of the strap is only about twenty thousandths of an inch; although of course the invention can be practiced with straps of different thicknesses.

Figure 1:
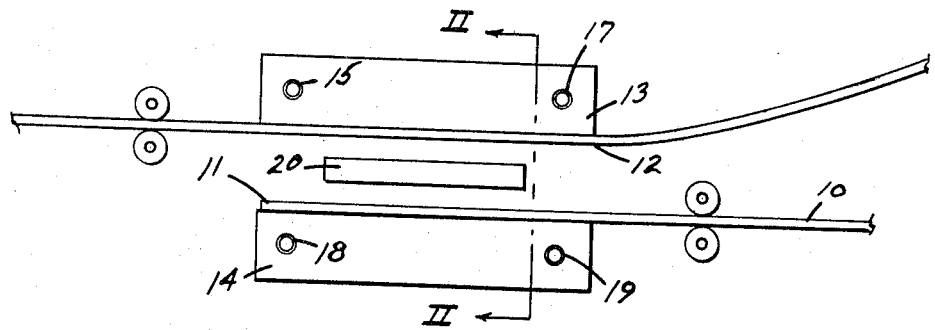
FIG. 1 is a diagrammatic side elevational view illustrating one form of apparatus useful in carrying out the method.

As previously indicated, the present invention can be employed for securing together two portions of a single stretch oriented polymeric strap or the end portions of two separate straps. In FIG. 1 a single strap is indicated at 10 having a free end portion 11 and a portion 12 which either extends to a supply or may itself be an actual end of the strap. The two portions of the strap extend between guide rollers or are otherwise held in spaced-apart face-to-face relationship. As indicated in the drawing the spacing between the strap portions is determined by abutment of the portions against a pair of elements 13 and 14. Preferably elements 13 and 14 are maintained in a cold condition and toward this end a cooling liquid is circulated therethrough. The cooling liquid is delivered to element 13 through a pipe 15 and after circulating through a channel 16 is ejected through a pipe 17. Element 14 is similarly cooled, the liquid cooling agent being introduced through a pipe 18 and discharged through a pipe 19.

Figure 2:
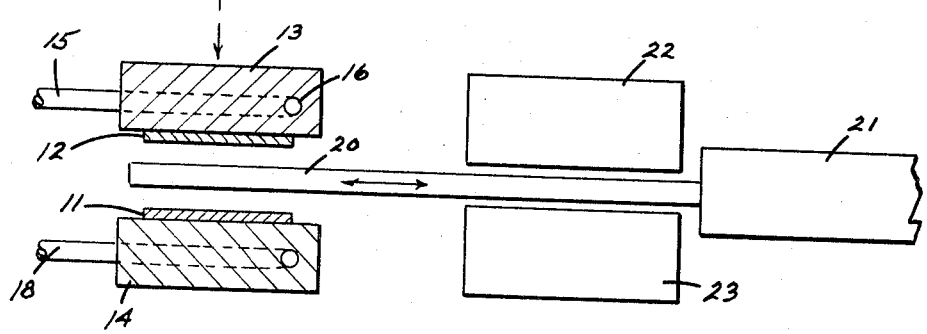
FIG. 2 is a sectional view taken on the line II—II of FIG. 1.
Figure 3:
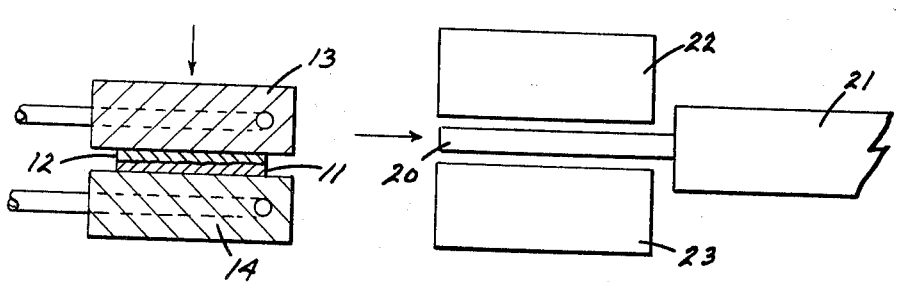
FIG. 3 is a view similar to FIG. 2 showing a further step of the method.
Figure 4:
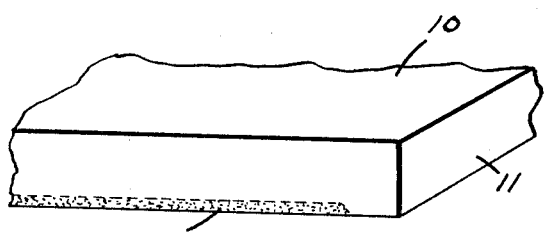
FIG. 4 is a greatly enlarged perspective view of an end portion of the strap after it has been conditioned for heat sealing.

In preparing the two strap portions 11 and 12 for securement together, sufficient energy is introduced between the opposed faces of the strap portions to melt and render viscous the facing areas and a zone of the strap immediately adjacent the facing areas. Preferably the energy employed is in the form of radiated heat supplied by a thin-blade-like heating element 20. Element 20 is connected to the piston of a pneumatic cylinder 21 by means of which it may be projected from a retracted position shown in FIG. 3 to a position between and out of contact with the spaced-apart strap portions 11 and 12 as shown in FIG. 2. When element 20 is in its retracted position the end thereof is located between a pair of heating devices 22 and 23 by means of which it is maintained at a substantially elevated temperature. To condition the strap portions for heat sealing together, element 20 is very briefly moved to a position between the two strap portions as indicated in FIG. 2. When the strap is formed of polypropylene it will soften at a temperature as low as about 225° F. and melt at about 310° F. It has been found that when heating element 20 is maintained at a temperature of between about 1100° F. and 1200° F. and the two strap portions are each about 1/16 inch from the element, the inner faces of the strap will be melted to a depth of three or four thousandths of an inch upon insertion of the heating element therebetween for an extremely short time on the order of a few milliseconds. Since, as previously mentioned, the strap will normally be about twenty thousandths of an inch thick, it will be aparent that this procedure will leave the major portion of the cross section of the strap unaffected even though in addition to the melted zone, the strap may be softened to the point of molecular disorientation for an additional two or three thousandths of an inch. In FIG. 4 the melted zone of end portion 11 of the strap is indicated at 24.

As previously mentioned, when the stretch oriented polymeric strap is heated even to the softening point the molecules lose their orientation and the strap shrinks and loses tensile strength. However, in accordance with the present invention the strap does not shrink to any substantial extent because only a relatively minor portion of the overall strap thickness is affected by the heat and the unaffected area provides sufficient strength or rigidity to prevent the softened area from shrinking. When the facing areas of the strap are thus melted, heating element 20 is returned to the FIG. 3 position and the melted strap areas are immediately squeezed together by moving element 13 toward the element 14 as shown in FIG. 3. The strap portions are held under pressure until the melted portions fuse together and in the case of a polypropylene strap the time required to accomplish this fusion may be as short as ½ second. Since the heating element is inserted between the two strap portions for only a few milliseconds, the entire procedure may be completed in a very brief time.

Elements 13 and 14 are squeezing or pressing elements and desirably they extend over an area of the outer faces of the strap portions greater than the area of the melted inner faces. The reason for this is to insure that the entire melted area of each strap portion is pressed firmly against the other strap portion so that no part of the strap which has been melted will be left unattached to the other strap portion. Thus, even though the strap becomes molecularly unoriented through only a relatively small percentage of its cross section, its overall strength is of course weakened at that point but when the overlapping portions become fused together then the overall thickness of the unaffected strap is greater at the joint than over the rest of the strap length. As shown in the enlarged FIG. 4 the melted and therefore viscous zone 24 does not extend to the very tip of end portion 11 of the strap. If the melted portion 24 extended all the way to the tip of end portion 11, then there would be a good chance that portion 12 would have been melted beyond the point of overlap with end portion 11 and this would leave a cross section of the strap immediately adjacent the joint which was weaker than the rest of the strap. If strap portion 12 extends to a supply as indicated in FIG. 1, then after the joint has been made said portion is cut away from the supply at a distance slightly removed from the melted area, thus assuring that the entire melted area of portion 11 is fused with strap portion 12.

Pressing elements 13 and 14 are kept cool to assure that the major part of the cross section of the overlapping strap portions is maintained in stretch oriented condition by preventing the heat from migrating through the strap from the melted inner faces during the time the pressure is being maintained.

It is necessary in order to obtain proper fusion and thereby a good seal between the overlapping strap portions that at least one of the opposed strap face areas actually be melted, that is raised to a temperature above the softening point. It has been found that the strap can be melted in a zone including and immediately adjacent the inner faces of the overlapping portions without affecting the major part of those portions by employing a relatively high temperature for a very brief time. When a lower temperature and a longer time is used, it becomes difficult if not impossible to prevent the entire cross section from being affected. There are also advantages to spacing the strap from the heating element and radiating the heat through the air gap to the strap. For example, when the strap contacts the heating element there is the likelihood that some of the melted portion of the strap will adhere to the heating element and therefore not be available for fusing the strap portions together when they are subsequently squeezed by pressing elements 13 and 14. Furthermore, a coating of strap material may build up on the heating element and interfere with proper heat transmission. It is possible to obtain good seals even when the strap contacts the heating element but preferably such direct contact should be avoided.

It will be apparent that pressing elements 13 and 14 can be cooled by means other than outlined above and that in squeezing the softened strap portions together element 14 could be the movable element or elements 13 and 14 could be moved simultaneously. It will also be apparent that heating element 20 may contain an electrical heating unit rather than be heated by the separate heaters 22 and 23, and the heating element could have a substantial thickness rather than being blade-like. Also element 20 may be moved to and from position between the spaced apart strap portion by means other than the pneumatic cylinder 21. Thus the particular apparatus for carrying out the above described method steps may be varied considerably.

Having thus described the invention, what is claimed is:

The method of securing a stretch oriented polymeric strap about an article comprising withdrawing the strap from a supply and positioning it about the article so as to provide overlapping but spaced apart end portions one of which is the free end and the other of which extends to the supply, introducing heat between the overlapping end portions by briefly inserting a hot element therebetween but out of contact therewith to soften the facing areas thereof while maintaining the remainder of the end portions in normal condition, pressing the softened areas together with cold devices which extend along the strap beyond the softened areas, maintaining the softened areas under pressure until they fuse to thus secure a length of strap about the package, and severing the secured length from the supply.

References Cited by the Examiner

UNITED STATES PATENTS

| | | |
|---|---|---|
| 2,387,566 | 10/1945 | Custers. |
| 2,741,885 | 4/1956 | Allison. |
| 3,016,085 | 1/1962 | Gassner _____ 156—499 XR |
| 3,022,543 | 2/1962 | Baird, et al. |
| 3,023,554 | 3/1962 | Hlavacek et al. ____ 53—30 XR |
| 3,210,227 | 10/1965 | Shichman _____ 156—306 XR |

GRANVILLE Y. CUSTER, Jr., *Primary Examiner.*